A. ELMENDORF.
METHOD OF FORMING SHEETS BY GLUING PIECES EDGE TO EDGE.
APPLICATION FILED MAY 20, 1920.
1,366,172. Patented Jan. 18, 1921.
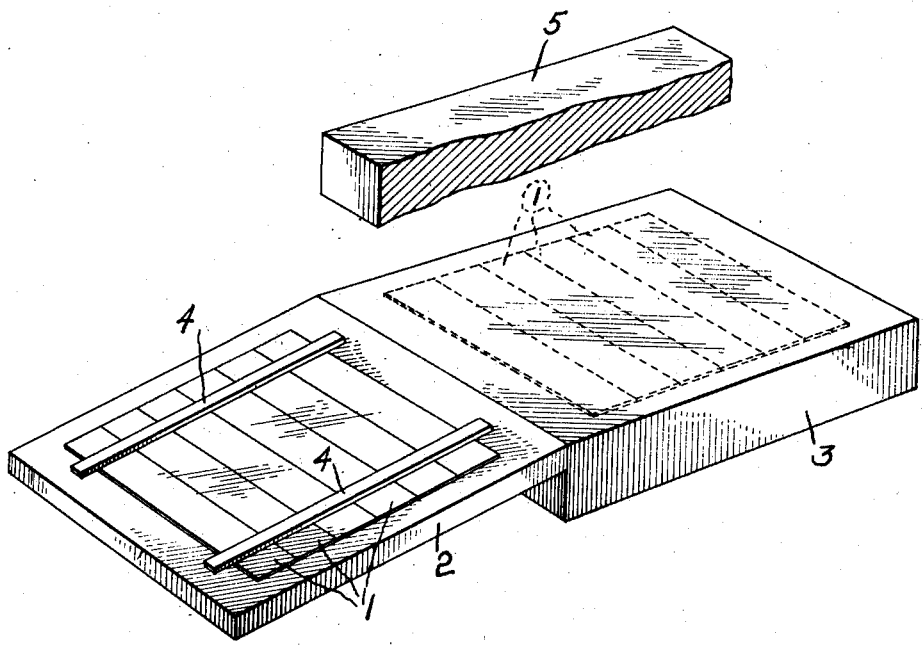

UNITED STATES PATENT OFFICE.

ARMIN ELMENDORF, OF MADISON, WISCONSIN, ASSIGNOR TO HASKELITE MANUFACTURING CORPORATION, A CORPORATION OF NEW YORK.

METHOD OF FORMING SHEETS BY GLUING PIECES EDGE TO EDGE.

1,366,172. Specification of Letters Patent. Patented Jan. 18, 1921.

Application filed May 20, 1920. Serial No. 382,952.

*To all whom it may concern:*

Be it known that I, ARMIN ELMENDORF, a citizen of the United States, residing at Madison, county of Dane, State of Wisconsin, have invented a certain new and useful Improvement in Methods of Forming Sheets by Gluing Pieces Edge to Edge, and declare the following to be a full, clear and exact description of the same, such as will enable others skilled in the art to which it pertains to make and use the same, reference being had to the accompanying drawings, which form a part of this specification.

One of the problems in manufacturing ply-wood panels is the building up of the individual layers or sheets out of thin pieces or strips glued edge to edge. The object of the present invention is to devise a simple and novel process which will permit these sheets to be formed expeditiously and economically in ordinary presses, for example, presses of the kind employed in gluing together a plurality of sheets or layers, without employing temporary fastening devices or other expedients which increase the cost of labor and materials.

The accompanying drawing is a diagrammatic illustration of my improved method and the apparatus employed in carrying it out.

In gluing together pieces of veneer or other thin material, edge to edge, it is necessary that the edges to be joined be brought into intimate contact with each other; but I have discovered that sheets adapted for many purposes may satisfactorily be produced without maintaining a direct pressure between the constituent elements transverse to the joints such as is brought about by placing two pieces in a clamp or vise which exerts holding forces at right angles to the surfaces to be joined; provided, however, that intimate contact between the edges of the pieces to be joined is brought about as a preliminary step to the clamping of the sheet between plates or elements engaging with the flat faces of the sheet. This intimate contact between the several pieces out of which a sheet is to be formed can be brought about in a very simple manner. By laying the various pieces to be glued together on a flat surface, after glue has been applied to the edges to be joined, and pushing this rudimentary sheet across the surface by means of forces acting on the plane of the sheet from one end thereof in a direction at right angles to the joints, the joints are caused to be closed. Ordinarily the pieces to be glued together are thin and light so that, while the edges can be brought together in the manner just described, the pressure between the contacting edges, which is due principally to the frictional resistance between the supporting surface and the pieces in advance of that piece to which the pushing forces are applied, will be comparatively small. Therefore, in order to increase the pressure between the contacting edges, I place weights on the top of the rudimentary sheet, thus increasing the resistance to travel when the sheet is pushed along the support. These weights are preferably placed so as to extend across the joints, thus preventing one piece from jumping up and overlapping the piece in advance thereof. The weighting means may consist of bars of iron long enough to extend transversely of the joints across the entire length of the sheet, two of such bars, one to be placed near each of the side edges of the sheet, being sufficient for sheets of ordinary width.

In carrying out my invention a series of pieces, indicated at 1 in the drawing, out of which a sheet is to be made, are laid edge to edge upon a suitable flat table, 2, arranged adjacent to the lower member, 3, of a suitable press large enough to receive the sheet; the top surface of the member 3 being flush with the top of the table or with the adjacent upper edge thereof, glue having first been applied to the edges to be joined together. A pair of iron bars, 4, 4, are than laid on the rudimentary sheet across the joints therein. The work is preferably done by two persons, one on each side of the table, each person handling one of the bars; and, after the parts have been assembled as explained, each person pushes forwardly on the adjacent end of the rearmost piece so as to push the weighted sheet along the table and upon the lower member of the press to the position indicated in dotted lines. The bars are then removed and the upper member, 5, of the press is closed down upon the sheet. In removing the bars they are preferably drawn backward while still resting on the work, the workman holding the rearmost piece against retrograde movement, so that the friction between the bar and the other pieces produces a pressure in the joints during the withdrawal of the bars. When the press is closed on the work, the joints being already tightly closed, they will be held closed and, because the waves or irregularities in the sheet will be straightened out in the press, and effective clamping pressure in the joints will be brought about.

My improved process is particularly useful in forming waterproof sheets, that is sheets joined with waterproof glue such as blood albumin glue. In this case the press will be a hot press in which the heat is applied in any suitable manner, so that the glue will be set by heat.

I claim:

The method of gluing thin pieces or strips edge to edge to form sheets which consists in placing glue on the edges to be joined, laying the pieces edge to edge on a flat supporting surface, laying weights on the group of pieces across the joints, pushing the assembled weighted sheet into a press by forces applied to the rearmost piece, removing the weights, and closing the press.

In testimony whereof I sign this specification.

ARMIN ELMENDORF.